United States Patent [19]

Saarinen et al.

[11] Patent Number: 4,646,494

[45] Date of Patent: Mar. 3, 1987

[54] BUILDING PANEL AND SYSTEM

[76] Inventors: Olli Saarinen, Kreetankuja 2 C 34, SF-33950 Pirkkala; Paavo Tihveräinen, Koipiniemi, SF-33720 Tampere; Seppo Rinne, Soinilankatu 30 E 17, SF-33730 Tampere; Lauri Mehto, Marjaniemenkatu 38 A, SF-00930 Helsinki, all of Finland

[21] Appl. No.: 654,617

[22] Filed: Sep. 26, 1984

Related U.S. Application Data

[63] Continuation-in-part of Ser. No. 360,082, Mar. 19, 1982, abandoned.

[30] Foreign Application Priority Data

Mar. 19, 1981 [FI] Finland ................................ 810857

[51] Int. Cl.⁴ .............................................. E04C 2/00
[52] U.S. Cl. ...................... 52/232; 52/309.9; 52/408; 52/811
[58] Field of Search ............... 52/408, 409, 410, 309.9, 52/309.11, 232, 805, 802, 811, 803, 804

[56] References Cited

U.S. PATENT DOCUMENTS

| 678,903 | 7/1901 | Rapp | 52/803 |
|---|---|---|---|
| 2,074,442 | 3/1937 | Venzie | 52/408 |
| 2,248,777 | 7/1941 | Peelle | 52/803 |
| 2,557,412 | 6/1951 | Clements | 52/803 |
| 2,833,004 | 5/1958 | Johnson | 52/803 |
| 4,226,071 | 10/1980 | Bennett | 52/409 |
| 4,353,188 | 10/1982 | Seago | 52/408 |
| 4,449,336 | 5/1984 | Kelly | 52/408 |

FOREIGN PATENT DOCUMENTS

| 3008699 | 9/1980 | Fed. Rep. of Germany . | |
|---|---|---|---|
| 1785/68 | 8/1968 | Finland . | |
| 59136 | 10/1981 | Finland . | |
| 2440443 | 5/1980 | France | 52/811 |
| 998868 | 7/1962 | United Kingdom . | |

Primary Examiner—Henry E. Raduazo
Attorney, Agent, or Firm—Pollock, Vande Sande & Priddy

[57] ABSTRACT

An improved building panel for wall and roof systems comprises a core of expanded polystyrene or polyurethene foam faced with a layer of wood particle board of gypsum board covered by a layer of steel fastened to the particle board of gypsum so that during fire conditions, gases of vapors evolved from particle board of gypsum board can escape from the interior of the panel but air exterior to the panel is prevented from entering, thereby ensuring that the load-bearing capacity of the panel is maintained for an extended period of time during a fire.

9 Claims, 13 Drawing Figures

BUILDING PANEL AND SYSTEM

CROSS-REFERENCE TO A RELATED APPLICATION

This application is a continuation-in-part of Ser. No. 360,082 filed Mar. 19, 1982, by the present applicants for Building Element and now abandoned.

TECHNICAL FIELD

The invention relates to an improved building panel and building system for wall and roof construction. Specifically, the invention concerns such panels made from layers or laminae of various materials to form a sort of sandwich-like construction.

BACKGROUND ART

For a number of years, it has been known to manufacture building panels for wall and roof construction by using the so-called sandwich principle, whereby at least one surface of a layer or lamina of thermal insulating material, such as cellular polystyrene or polyurethane, is adhered by glue to a metal layer or sheet, such as a galvanized steel sheet having a plastic coated outer surface. As a result of this configuration, the metal layer of such prior art panels functions as a weight carrying part of the completed panel. This type of construction provides several advantages with regard to both the manufacturing technique and the ultimate use of the panel. Particularly, the method for manufacturing such panels is simple and the panels themselves have both weight carrying and thermal insulating properties.

Such prior art panels, however, have the disadvantage that they cannot be classified among those construction materials which are considered to have fireproof properties. A fireproof construction panel must have such properties that it can maintain its weight carrying capacity for an extended period of time in spite of heat acting directly on the panel during a fire. Prior art sandwich-type panels having a core made of a layer of expanded polystyrene foam with steel sheets glued to both surfaces of the core, do not fulfil the fireproof requirements which have been established by many governmental authorities. For example, Finland has its own requirements for fireproof building materials which state that if a certain building panel is to be classified as fireproof in the Class B-10, it must endure heat for ten minutes and maintain its weight carrying capacity during that time.

Prior art building panels very quickly loose their weight carrying capacity after they have been exposed to heat. It has been observed that shortly after the surface of such prior art panels has been exposed to heat, the exposed steel layer buckles away from the core due to the thermal expansion and degradation of the laminating glue caused by heat. As a result, the prior art panel looses a substantial part of its weight carrying capacity. Another important feature of prior art building panels which greatly affects their fireproof properties is that the temperature at which polystyrene softens and becomes gaseous is approximately 100 degrees Celsius. This means that if the heat acting on the surface of the panel causes the temperature inside the panel to rise above 100 degrees Celsius, the polystyrene core starts very quickly to become gaseous. Because the polystyrene core is the layer of the panel which joins the two outer steel layers to each other, the result of gasification of the core is almost instantaneous loss of weight carrying capacity and total collapse of the panel.

DISCLOSURE OF THE INVENTION

The primary object of the present invention is to provide an improved building panel and system for assembling such panels into wall and roof structures by means of which it is possible to overcome these disadvantageous features of the prior art.

A further object of the invention is to provide such a panel and system in which the performance of the panel during fire conditions justifies its classification as a highly fireproof construction material.

These objects of the advantage are given by way of example; so, other desirable objectives and advantages of the invention may occur or become apparent to those skilled in the art. Nonetheless, the scope of the invention is to be limited only by the appended claims.

In its simplest embodiment, an improved fireproof panel according to the invention comprises three layers joined to each other by a suitable adhesive. The overall panel and each of these layers are substantially quadrangular and preferably rectangular, to facilitate their use in building construction. The first layer is made from a cellular, thermal insulating material such as polystyrene foam. The second layer is made from a load bearing material such as galvanized steel. Between these two layers, a third load bearing layer is provided which normally extends completely between the layers and contacts at least the second, steel layer. This third layer is made of a material which has sufficient mechanical strength to maintain the load-bearing capacity of the panel for an extended period of time when heat due to a fire has been apllied externally to the second, steel layer and caused the load-bearing characteristics of the steel layer to degrade. The material of the third layer also has sufficient thermal insulating properties to prevent damage to the layer of cellular, thermal insulating material during this extended period of time. An important feature of the invention is that means are provided which are operatively associated with at least one pair of opposite edges of the second and third layers for permitting gases evolved from the third layer during application of heat to escape from between the second and third layers while at the same time preventing air external to the panel from entering the space which is created between the second and third layers by the pressure of the evolved gases. Because air is prevented from entering this space, open combustion of the material of the third layer is substantially prevented and its loadbearing capacity degrades only slowly during the extended period of time.

The third layer may be made from a material such as wood particle board which substantially maintains its load bearing capacity even as the material carbonizes following application of heat. Simultaneously, the carbonizing a material thermally insulates the layer of cellular, thermal insulating material to prevent formation of a gaseous phase in the cellular material. Alternatively, the third layer may be made from a material such gypsum board which maintains its load bearing capacity during vaporization of its water of crystallization following application of heat and simultaneously absorbs the latent heat of crystallization from the heat applied. Thus, the temperature of the layer of cellular material is prevented from reaching a level at which a gaseous phase is formed in the cellular material.

The means for permitting flow of gases from the space between the second and third layers while preventing entry of air may comprise a plurality of spaced fasteners extending between the second and third layers near at least one pair of opposite edges of these layers. As result of this configuration, the gases evolved from the third layer pass between the second and third layers to the exterior of the panel at locations between the fasteners. In a preferred embodiment, the second layer comprises a lip at each of at least one pair of opposite edges, for engaging the corresponding opposite edges of the third layer. A plurality of fasteners extends through these lips into the third layer. Because of the manner in which the building panel according to the invention is mounted to construct a wall or roof system, it is not mandatory that all edges of the panel be provided with such fasteners and lips; however, the provision of a panel having such fasteners and lips on all edges is well within the scope of the present invention.

In situations where a wall must be able to withstand fire from both sides, a further layer similar to the third layer previously described and an additional steel layer may be added to the other side of the panel previously described. Also, rather than using a single layer of either wood particle board or gypsum board, it is within the scope of the invention to use layers of both materials on one or both sides of the cellular insulating material.

Panels of the type previously described are assembled into a wall or roof system by providing a plurality of spaced, essentially parallel elongated support members such as the wall and roof girders used in modern building construction. A plurality of fireproof panels of the type previously described are mounted on the support members so that at least one pair of opposite edges of each panel, which comprise the means for permitting gases evolved to escape while preventing air from entering, will extend transversely between the support members. The remaining pair of opposite edges of each panel extends axially along the support members. The second, steel layer of each panel is clamped to the support members along this remaining pair of opposite edges. As a result of this configuration, the gases evolved in the panel during a fire are permitted to escape along the edges of the panel which extend transversely between the support members but are prevented from escaping along the edges of the panel which are clamped to the support members. To prevent fire from reaching between the panels along the edges which extend transversely to the support members, fillet strips of wood particle board or gypsum board are positioned between the panels in grooves extending along the transverse edges of the panels.

BEST MODE FOR CARRYING OUT THE INVENTION

The following is a detailed description of the preferred embodiments of the invention, reference being made to the drawings in which like reference numerals identify like elements of structure in each of the several Figures.

Figure 1:
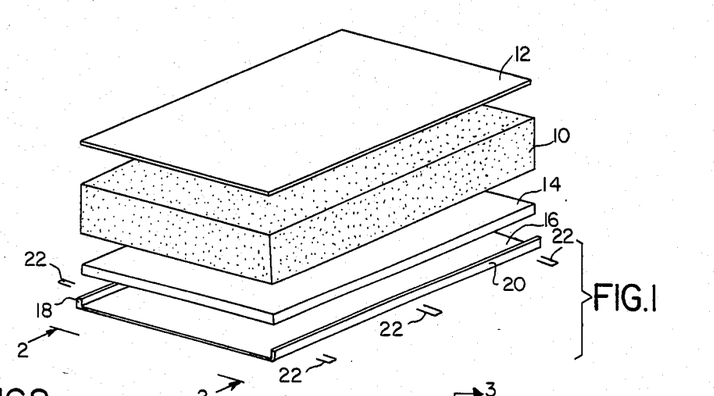
FIG. 1 shows an exploded, perspective view of a simplified building panel embodying the major features of the present invention.

In the simplified, exploded view of FIG. 1, a fireproof building panel according to the invention can be seen to comprise a slab or core layer 10 of cellular thermal insulating material. Layer 10 may be made from materials such as expanded polystyrene or polyurethane foam which have a normal density of approximately 20 kilograms per cubic meter. A layer 12 of similar area, made of hot-dipped, zinc-coated steel and coated on its exterior with a layer of polyvinyl chloride, is joined to the upper surface of layer 10 using a suitable adhesive such as a polyurethane glue. A suitable adhesive is type UK 8103 with hardening agent made by the Henkel Company. On the opposite of layer 10 from layer 12 is a 14 of similar area, made of wood particle board or gypsum board and also is glued to layer 10. The underside of layer 14 is glued to a layer 16 of similar area, also made from hot-dipped, zinc-coated steel coated on its exterior with a layer of polyvinyl chloride. Each of layers or sheets 10, 12, 14 and 16 is substantially quadrangular, preferably rectangular. At least one pair of opposite edges of layer 16 are provided with essentially perpendicular flanges or lips 18,20 which engage at least one corresponding pair of edges of layer 14. A plurality of fasteners 22, such as long staples, nails or screws, are spaced along lips 18,20 at distances of 15 centimeters or so and extend through lips 18,20 into layer 14.

Figure 2:
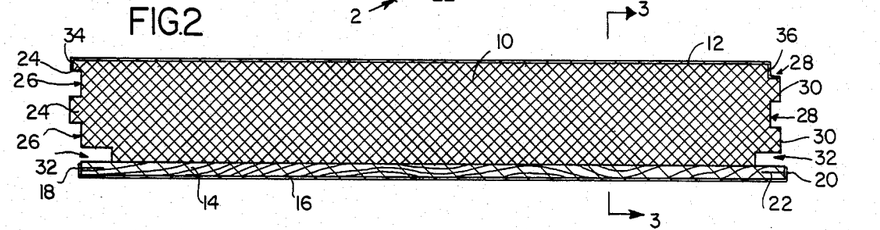
FIG. 2 shows a transverse section through an actual building panel made in accordance with the invention, as viewed in the direction of line 2—2 in FIG. 1.
Figure 3:
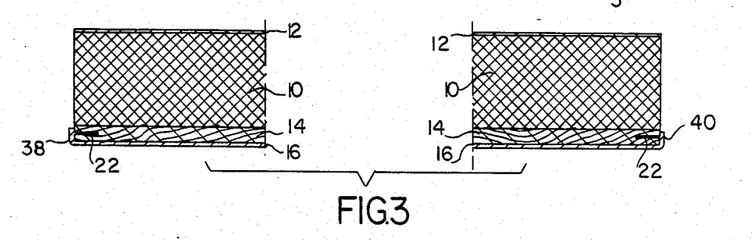
FIG. 3 shows a fragmentary sectional view of an actual building panel taken along line 3—3 of FIG. 2.

Although a simple panel such as would be produced from the assembly of elements shown in FIG. 1 is suitable for many applications, it is preferred that the edges of the panel at which lips 18,20 are provided also include interlocking joints to facilitate assembly of the panels into wall and roof systems. Thus, as illustrated in FIG. 2, one of these edges preferably includes a pair of lands 24 separated by a pair of grooves 26 which together mate with a corresponding pair of grooves 28 and a pair of lands 30 on an adjacent panel. Also, just above the same edges of layer 14, the panel preferably includes fillet grooves 32 which extend along the entire length of the edge for a purpose which will be discussed with respect to FIGS. 8, 12 and 13. When the panel is to be used for wall systems, steel layer 12 preferably includes on one edge a lip 34 which extends over the upper one of lands 24 and on its opposite edge a lip 36 which extends into the upper one of grooves 28 and across the upper edge of the upper one of lands 30. As shown in FIG. 3, steel layer 16 also may include on the remaining opposite edges of the panel a pair of essentially perpendicular flanges or lips 38,40 which engage the remaining pair of edges of layer 14 and are fastened to layer 14 by additional fasteners 22. The use of lips 38,40 is not mandatory in building panels constructed in accordance with the invention, as will be made clear subsequently.

Figure 4:
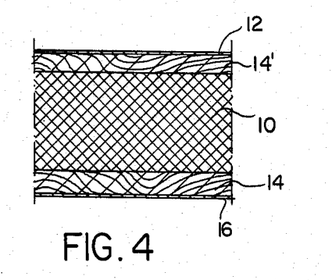
FIG. 4 shows a fragmentary sectional view through a building panel configured to resist fire from both sides.

FIG. 4 shows that a panel in accordance with the invention may include another layer 14' substantially identical to layer 14 but positioned on the other side layer 10; so, that the resulting panel will be fireproof on both sides. Such a panel is useful for partition walls, outer walls and roofs.

Figure 4A:
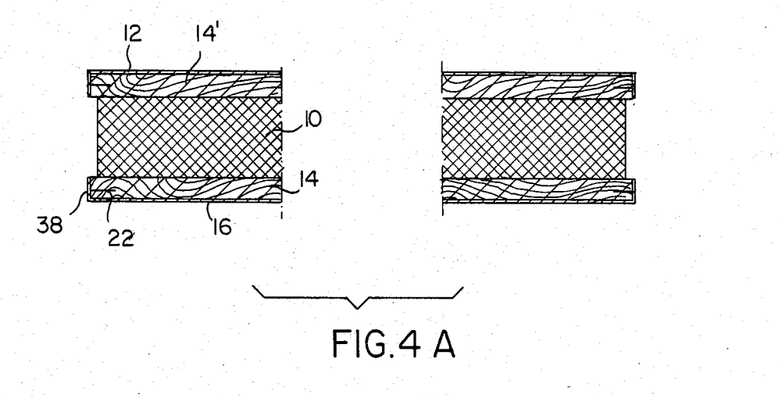
FIG. 4A shows a fragmentary sectional view through a building panel of FIG. 4 showing features of FIG. 3 on both sides of the panel.

FIG. 4A shows a panel of FIG. 4 with lips 38 fastened to layers 14 and 14' by fasteners 22.

Figure 5:
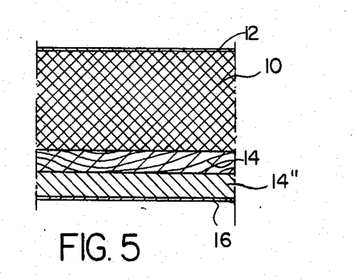
FIG. 5 shows a fragmentary sectional view through a building panel having two layers of additional load-bearing material on one side of the cellular material.

FIG. 5 illustrates a panel in accordance with the invention may include both a wood particle board layer 14 and a gypsum board layer 14" on the same side of layer 10; so that, the fireproof characteristics of the panel will be classified at an even higher level. In this embodiment, it would be necessary for lips 18,20 to extend across the opposite edges of layer 14" and substantially across the opposite edges of layer 14 so that the panel would perform in the manner now to be discussed.

Figure 6:
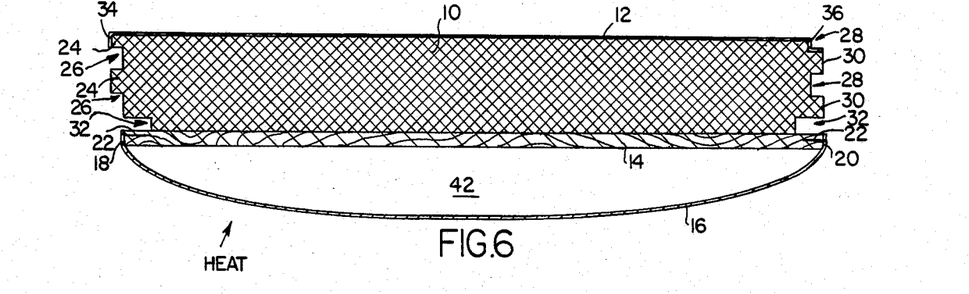
FIGS. 6-9 illustrate the mode of behavior of a building panel according to the invention during a fire.
Figure 7:
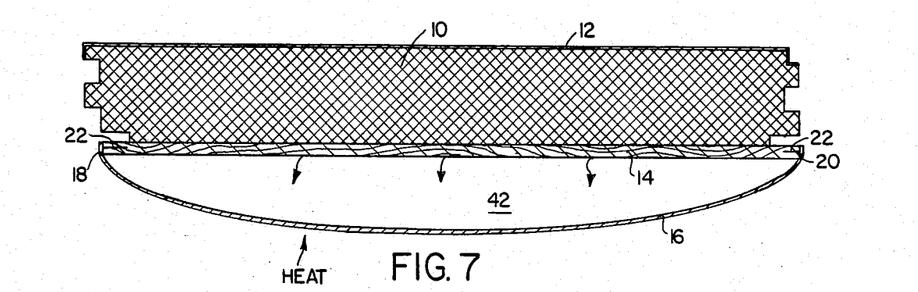

FIG. 2 illustrates a panel according to the invention as it would appear during normal use when there is no fire external to layer 16. If heat is applied to the exterior of layer 16, the heat eventually will cause the metal of layer 16 to lengthen due to its increase in temperature. As the glue joining layer 16 to layer 14 softens, layer 16 eventually will buckle outward to a configuration such as shown in FIG. 6, thereby establishing an open space 42 between layers 16 and 14. When layer 14 is made from a wood based or wood particle board sheet, the continued application of heat vaporizes moisture within layer 14 and eventually rather combustible gases begin to evolve from layer 14 into space 42 as shown in FIG. 6. The pressure within space 42 thus begins to rise to a level considerably exceeding that of the ambient atmosphere. On the other hand, when layer 14 is made from gypsum board, the application of heat causes the water of crystallization of the gypsum to vaporize into space 42 so that the pressure within space 42 soon reaches a level exceeding that in the ambient atmosphere.

Figure 8:
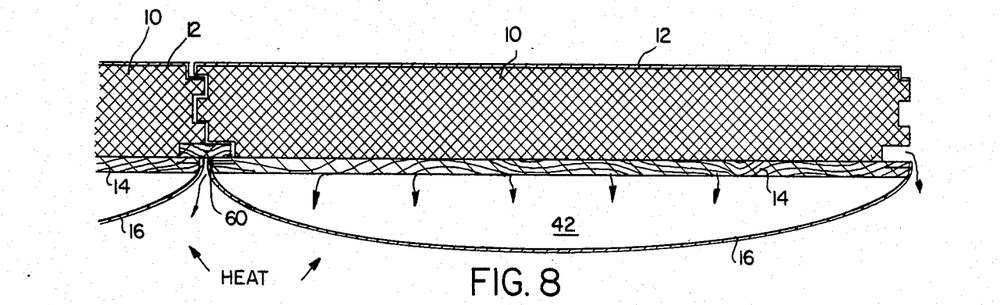

As the pressure within space 42 rises, it eventually reaches a level at which the trapped gases burst out between layers 14 and 16 at the edges of the panel at locations between the fasteners 22, as shown in FIG. 8. When layer 14 is made from a wood based product, these gases may burn once they have left space 42; however, the vaporized water of crystallization of a gypsum based layer 14 are not flammable. The excess of pressure within space 42 and the outward flow of gases from this space prevent the entrance of air from the ambient atmosphere into the space. Thus, there exists virtually no possibility of open combustion within space 42; so that the load bearing capacity of layer 14 only slowly degrades. On the other hand, the escape of the evolved gases is quite necessary because the quantity of gases evolved, if not permitted to escape, eventually would cause failure of the panel due to excess interior pressure. Layers 14 made from wood based products such as particle board retain a considerable portion of their weight carrying capacity even though they become carbonized to a considerable extent during application of heat. Similarly, the gypsum based layers 14 retain their weight carrying capacity even though a considerable amount of their water of crystallization is lost. In both cases, the layers 14 retain a considerable thermal insulating capability over an extended period of time.

Figure 9:
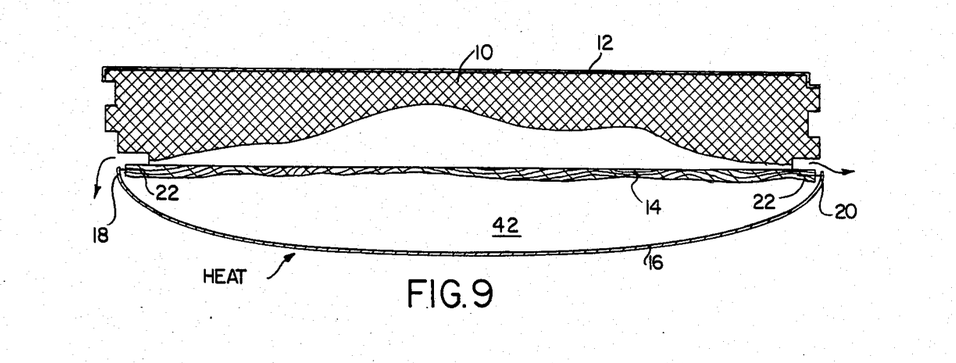

Eventually as the fire progresses, the temperature at the surface of core layer 10 between the core and sheet 14 will reach approximately 100 degrees Celsius. At this point, the material of layer 10 begins to melt and gasify as shown in FIG. 9. When this breakdown of layer 10 has reached a certain level and when the bonding forces between the remaining parts of the panel have diminished sufficiently, the panel will collapse. However, a panel configured in accordance with the present invention will maintain its load-bearing capacity for a considerably greater period than has been achievable with prior art panels.

Figure 10:
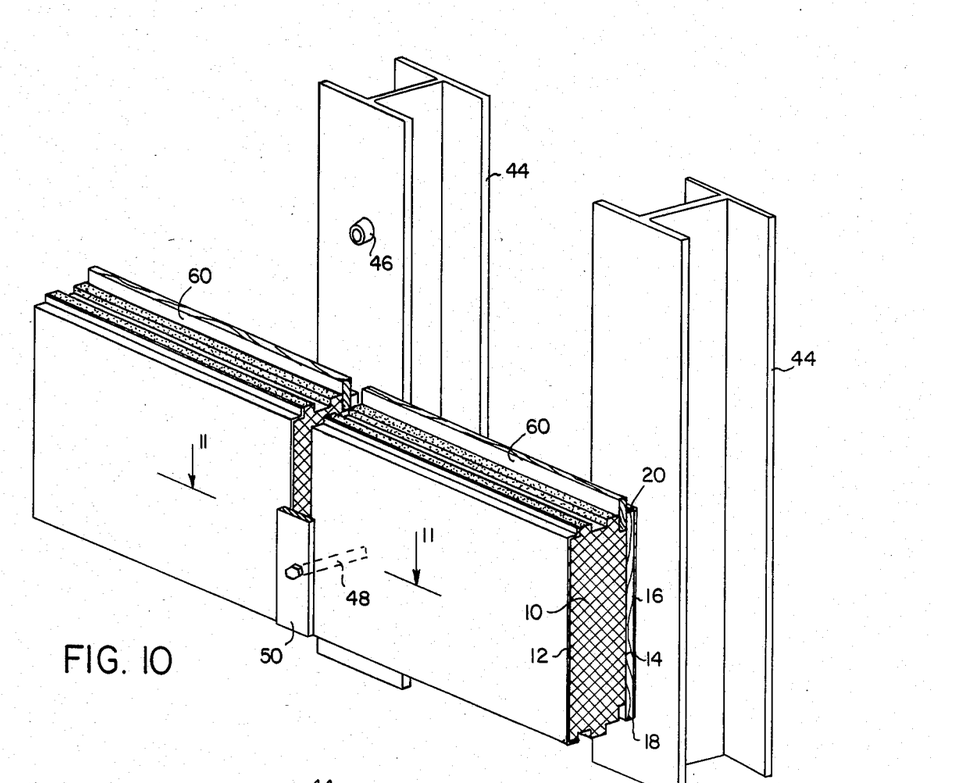
FIG. 10 shows a fragmentary, perspective view of a wall system according to the invention.
Figure 11:
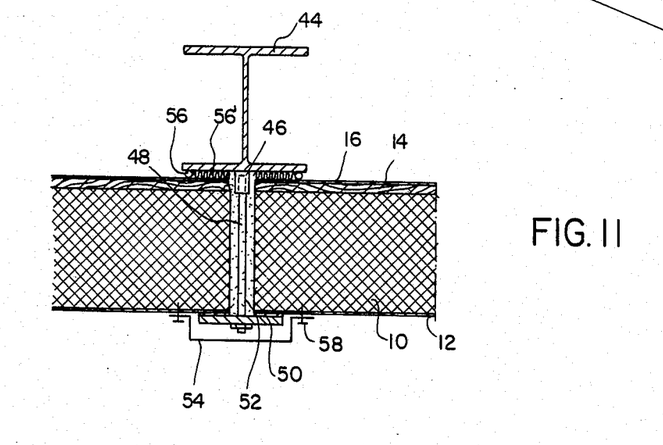
FIG. 11 shows a fragmentary view taken along line 11—11 of FIG. 10.

FIGS. 10 and 11 illustrate the manner in which a wall system according to the invention can be assembled using building panels of the type just described. A plurality of essentially parallel, typically vertical, elongated support members 44 are provided, such as I-beams or girders of the type commonly used in modern building construction. At axially spaced locations along support members 44 a plurality of internally threaded nuts 46 are welded in place. A plurality of panels according to the invention are mounted to support members 44 with their opposite edges at which lips 18,20 are provided extending transversely between the support members, as shown in FIG. 10. The remaining pair of opposite edges of each panel extend axially along spaced ones of support members 44 with steel layer 16 clamped to the support members along these remaining pairs of opposite edges. To achieve this clamping, a plurality of fastener bolts 48 and clamping strips 50 are provided. Bolts 48 extend through apertures in strips 50 and engage nuts 46 so that strips 50 extend across the gap between adjacent panels and are clamped to the outer steel layers 12. The gaps between panels may be filled with a urethane foam 52 or similar caulking material. Similarly, a silicone packing bead 56 may be applied between steel layer 16 and support member 44 to act as a moisture barrier. A rock wool gasket strip 56' also may be included between layer 16 and support member 44. For improved exterior appearance, a steel fillet cover 54 is positioned over clamping strip 50 and attached by suitable fasteners such as rivets 58, as shown in FIG. 11. Finally, fillet strips 60 are provided which extend between grooves 32 on adjacent panels, as seen, for instance, in FIG. 8. Because the opposite edges of the panel which extend axially along support members 44 are clamped in place, gases evolved from layers 14 do not escape along these edges but are forced to escape beneath lips 18,20 and between fasteners 22 in the manner previously described.

Figures 12, 13:
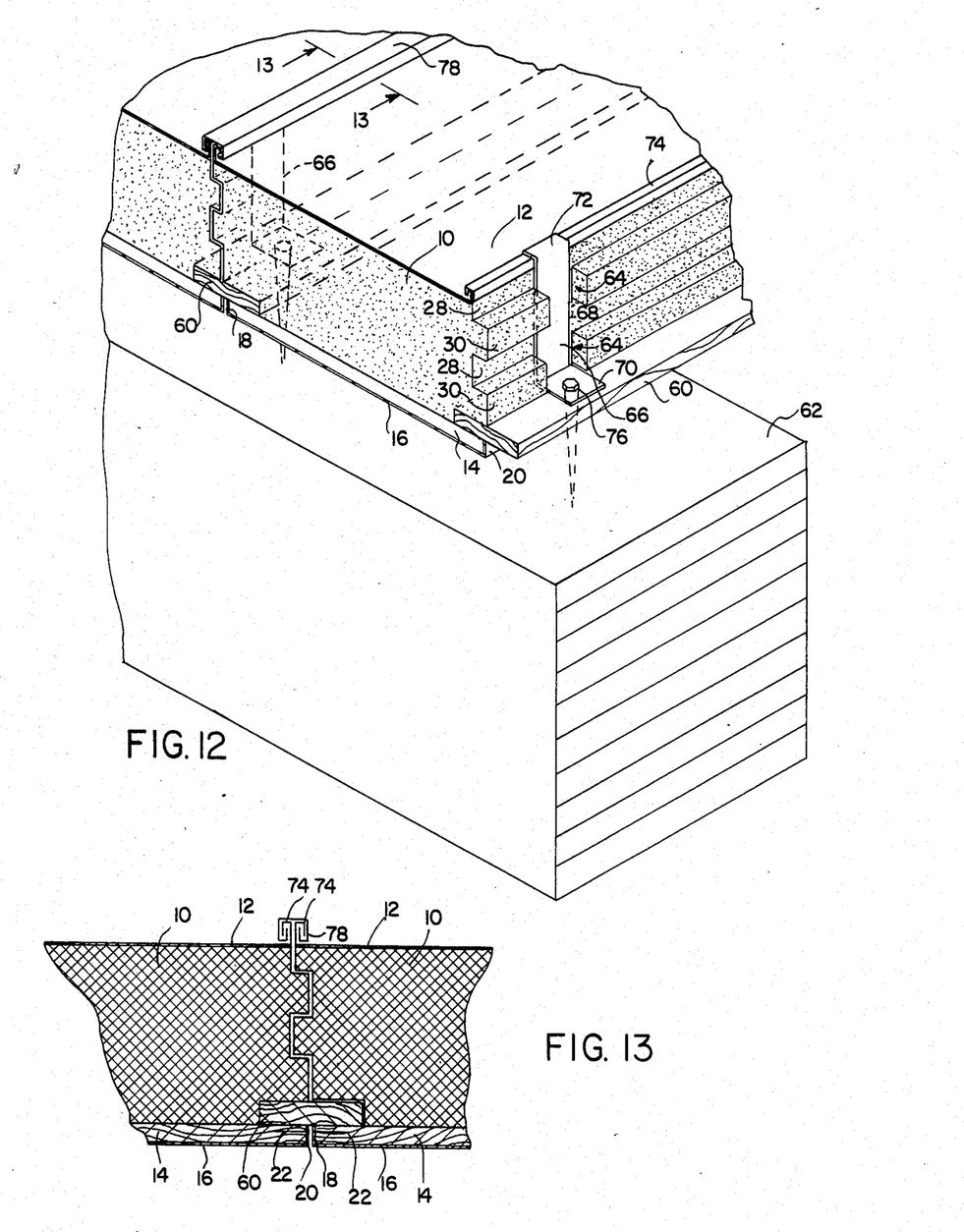
FIG. 12 shows a fragmentary, perspective view of a roof system according to the invention.
FIG. 13 shows a fragmentary view taken along line 13—13 of FIG. 12.

FIGS. 12 and 13 illustrate a roof system according to the invention. A plurality of parallel, horizontal or sloping, elongated support members 62 are provided, such as laminated wood beams, metal girders or the like. For simplicity, only one of such support members has been shown in FIG. 12. On one or both sides of each panel, lands 24 or 30 are provided with axially spaced transverse notches 64 within which mounting brakets 66 are positioned. Each bracket 66 comprises an outwardly projecting, strip-like portion 68 which lies at the bottom of notch 64 and grooves 28. At its innermost end, each bracket 66 comprises a transversely extending base flange 70 which contacts the outer surface of the fillet strip 60 extending between adjacent panels. At its outermost end, each bracket 66 comprises a transversely extending hook portion 72 which slips over a reversely bent flange 74 extending along the edges of steel layer 12 at the interlocking sides of each roof panel. The panels are mounted to support members 62 so that their interlocking edges extend transversely between the support members and their remaining opposite edges extend axially along the support members 62 in a manner similar to that described with respect to FIGS. 10 and 11. These remaining edges of the roofing panels are clamped in place with steel layer 16 contacting the support members by means of suitable fasteners 76 such as nails or screws which extend through base flange 70, fillet strip 60 and into support member 62 to clamp the roof panel in place. To close the gap between adjacent panels at their interlocking edges, an essentially U-shaped metal joint cover 78 is provided which slips over hook portions 72 and reversely bent flanges 74 to close the joint as shown in FIG. 13. The edges of the roof panels which extend along the support members 62 are provided with overlapping flanges (not shown) which prevent water leakage between the panels in the completed roof.

In actual embodiments of the invention, steel layers 12 and 16 had a thickness of approximately 0.5 mm and layer 10 had a thickness of approximately 200 mm. Layer 14 was made from wood particle board having a thickness of about 30 mm. The panel was approximately 1200 mm wide and 6000 mm long. In wall systems, support members 44 preferably are spaced about 6000 mm apart, center-to-center; whereas, in roof systems, support members 62 preferably are spaced about 3000 mm apart center-to-center.

Actual fire tests of wall and roof panels configured in the manner disclosed have been conducted in Finland in accordance with Nord Tests Method NT-FIRE 005, VTT-PAL-5. Roof systems loaded with a uniform load of 1.0 kN/M$^2$ and including a layer 14 made of particle board 22 mm thick endured fire conditions at the exterior surface of layer 16 without failure for an extended period of 26 minutes. Similarly, wall systems having a layer 14 of particle board 30 mm thick endured a fire at the exterior surface of layer 16 for an extended period of 38 minutes without collapse.

Having described our invention in sufficient detail to enable those skilled in the art to make and use it, we claim and desire to secure Letters Patent of the United States for:

1. An improved fireproof building panel, comprising:
   a first substantially quadrangular layer of cellular, thermal insulating material;
   a second, substantially quadrangular load bearing layer;
   a third, substantially quadrangular layer extending between said first and second layers and contacting at least said second layer, said third layer being made of a material having sufficient mechanical strength to maintain the load-bearing capacity of said panel for an extended period of time when heat applied externally to said second layer causes the load-bearing characteristics of said second layer to degrade, said material also having sufficient thermal insulation properties to prevent damage to said first layer during said extended period of time; and
   first means operatively associated with at least one pair of opposite edges of second and third layers for permitting gases evolved from said third layer during application of said heat to escape to the exterior of the panel from between said second and third layers and for preventing air external to said panel from entering the space created between said second and third layers by the pressure of said evolved gases,
   wherein said first means for permitting and preventing comprises a plurality of peripherally spaced fasteners extending between said second, load-bearing layer and said third, load-bearing layer near the peripheries of said layers, whereby said evolved gases pass between said second and third layers to the exterior of said panel at locations between said fasteners, and wherein said second layer comprises a lip at each of said at least one pair of opposite edges for engaging said at least one pair of opposite edges of said third layer, said plurality of fasteners extending through said lips into said third layer.

2. An improved fireproof building panel, comprising:
   a first substantially quadrangular layer of cellular, thermal insulating material;
   a second, substantially quadrangular load bearing layer;
   a third, substantially quadrangular layer extending between said first and second layers and contacting at least said second layer, said third layer being made of a material having sufficient mechanical strength to maintain the load-bearing capacity of said panel for an extended period of time when heat applied externally to said second layer causes the load-bearing characteristics of said second layer to degrade, said material also having sufficient thermal insulation properties to prevent damage to said first layer during said extended period of time; and
   first means operatively associated with at least one pair of opposite edges of second and third layers for permitting gases evolved from said third layer during application of said heat to escape to the exterior of the panel from between said second and third layers and for preventing air external to said panel from entering the spaced created between said second and third layers by the pressure of said evolved gases,
   wherein said first means for permitting and preventing comprises a plurality of peripherally spaced fasteners extending between said second, load-bearing layer and said third, load-bearing layer near the peripheries of said layers, whereby said evolved gases pass between said second and third layers to the exterior of said panel at locations between said fasteners,
   wherein said first means is associated with both pairs of opposite edges of said second and third layers, and wherein said second layer comprises a peripheral lip for engaging the periphery of said third layer, said plurality of fasteners extending through said lip into said third layer.

3. An improved fireproof building panel, comprising:
   a first substantially quadrangular layer of cellular, thermal insulating material;
   a second, substantially quadrangular load bearing layer;
   a third, substantially quadrangular layer extending between said first and second layers and contacting at least said second layer, said third layer being made of a material having sufficient mechanical strength to maintain the load-bearing capacity of said panel for an extended period of time when heat applied externally to said second layer causes the load-bearing characteristics of said second layer to degrade, said material also having sufficient thermal insulation properties to prevent damage to said first layer during said extended period of time; and a fourth, substantially quadrangular load-bearing layer;

a fifth, substantially quadrangular load-bearing layer normally extending between said first and fourth layers and contacting at least said fourth layer, said fifth layer being made of material having sufficient mechanical strength to maintain the load-bearing capacity of said panel for an extended period of time when heat applied externally to said fourth layer causes the load-bearing characteristics of said fourth layer to degrade, said material also having sufficient thermal insulation properties to prevent damage to said first layer during said extended period of time; and first means operatively associated with at least one pair of opposite edges of second and third layers for permitting gases evolved from said third layer during application of said heat to escape to the exterior of the panel from between said second and third layers and for preventing air external to said panel from entering the spaced created between said second and third layers by the pressure of said evolved gases wherein said first means for permitting and preventing comprises a plurality of peripherally spaced fasteners extending between said second, load-bearing layer and said third, load-bearing layer near the peripheries of said layers, whereby said evolved gases pass between said second and third layers to the exterior of said panel at locations between said fasteners, second means operatively associated with at least one pair of opposite edges of said fourth and fifth layers for permitting gas evolved from said fifth layer during application of said heat to escape from between said fourth and fifth layers and for preventing air external to said panel from entering the space created between said fourth and fifth layers by the pressure of said evolved gases, wherein said second means for permitting and preventing comprises a plurality of spaced fasteners extending between said fourth load-bearing layer and said fifth load-bearing layer near said at least one pair of opposite edge of said layers, whereby said evolved gases pass between said fourth and fifth layers to the exterior of said panel at locations between said fasteners, and wherein said fourth layer comprises a lip at each of said at least one pair of opposite edges of said fourth and fifth layers, for engaging said at least one pair of opposite edges of said fifth layer, said plurality of fasteners extending through said lips into said fifth layer.

4. An improved fireproof building panel, comprising:
a first substantially quadrangular layer of cellular, thermal insulating material;
a second, substantially quadrangular load bearing layer;
a third, substantially quadrangular layer extending between said first and second layers and contacting at least said second layer, said third layer being made of a material having sufficient mechanical strength to maintain the load-bearing capacity of said panel for an extended period of time when heat applied externally to said second layer causes the load-bearing characteristics of said second layer to degrade, said material also having sufficient thermal insulation properties to prevent damage to said first layer during said extended period of time; and a fourth, substantially quadrangular load-bearing layer;

a fifth, substantially quadrangular load-bearing layer normally extending between said first and fourth layers and contacting at least said fourth layer, said fifth layer being made of material having sufficient mechanical strength to maintain the load-bearing capacity of said panel for an extended period of time when heat applied externally to said fourth layer causes the load-bearing characteristics of said fourth layer to degrade, said material also having sufficient thermal insulation properties to prevent damage to said first layer during said extended period of time; and first means operatively associated with at least one pair of opposite edges of second and third layers for permitting gases evolved from said third layer during application of said heat to escape to the exterior of the panel from between said second and third layers and for preventing air external to said panel from entering the spaced created between said second and third layers by the pressure of said evolved gases wherein said first means for permitting and preventing comprises a plurality of peripherally spaced fasteners extending between said second, load-bearing layer and said third, load-bearing layer near the peripheries of said layers, whereby said evolved gases pass between said second and third layers to the exterior of said panel at locations between said fasteners, second means operatively associated with at least one pair of opposite edges of said fourth and fifth layers for permitting gas evolved from said fifth layer during application of said heat to escape from between said fourth and fifth layers and for preventing air external to said panel from entering the space created between said fourth and fifth layers by the pressure of said evolved gases, wherein said second means is associated with both pairs of opposite edges of said fourth and fifth layers, wherein said second means for permitting and preventing comprises a plurality of peripherally spaced fasteners extending between said fourth, load-bearing layer and said fifth, load-bearing layer near the peripheries of said layers, whereby said evolved gases pass between said fourth and fifth layers to the exterior of said panel at locations between said fasteners, and wherein said fourth layer comprises a peripheral lip for engaging the periphery of said fifth layer, said plurality of fasteners extending through said lip into said fifth layer.

5. An improved fireproof building system, comprising:
a plurality of spaced, essentially parallel elongated support members;
a plurality of fireproof panels, each panel comprising
a first, substantially quadrangular layer of cellular, thermal insulating material;
a second, substantially quadrangular, load-bearing layer;
a third, substantially quadrangular, load-bearing layer extending between said first and second layers and contacting at least said second layer, said third layer being made of a material having sufficient mechanical strength to maintain the load-bearing capacity of said panel for an extended period of time when heat applied externally to said second layer causes the load-bearing characteristics of said second layer to degrade, said material also having sufficient thermal insulation properties to prevent damage to said first layer during said extended period of time;

first means operatively associated with at least one pair of opposite edges of second and third layers for permitting gases evolved from said third layer during application of said heat to escape from between said second and third layers and for preventing air external to said panel from entering the space created between said second and third layers by the pressure of said evolved gases; and means for mounting said plurality of fireproof panels to said plurality of support members with said at least one pair of opposite edges of each panel extending transversely between said support members and with the remaining pair of opposite edges of each panel extending axially along said support members and for clamping said second layer to said support members along said remaining pair of opposite edges, wherein said first means for permitting and preventing comprises a plurality of spaced fasteners extending between said second, load-bearing layer and said third, load-bearing layer near said at least one pair of opposite edges of said layers, whereby said evolved gases pass between said second and third layers to the exterior of said panel at locations between said fasteners, and wherein said second layer comprises a lip at each of said at least one pair of opposite edges for engaging said at least one pair of opposite edges of said third layer, said plurality of fasteners extending through said lips into said third layer.

6. An improved fireproof building system, comprising:

a plurality of spaced, essentially parallel elongated support members;

a plurality of fireproof panels, each panel comprising
 a first, substantially quadrangular layer of cellular, thermal insulating material;
 a second, substantially quadrangular, load-bearing layer;
 a third, substantially quadrangular, load-bearing layer extending between said first and second layers and contacting at least said second layer, said third layer being made of a material having sufficient mechanical strength to maintain the load-bearing capacity of said panel for an extended period of time when heat applied externally to said second layer causes the load-bearing characteristics of said second layer to degrade, said material also having sufficient thermal insulation properties to prevent damage to said first layer during said extended period of time;

first means operatively associated with at least one pair of opposite edges of second and third layers for permitting gases evolved from said third layer during application of said heat to escape from between said second and third layers and for preventing air external to said panel from entering the space created between said second and third layers by the pressure of said evolved gases; and means for mounting said plurality of fireproof panels to said plurality of support members with said at least one pair of opposite edges of each panel extending transversely between said support members and with the remaining pair of opposite edges of each panel extending axially along said support members and for clamping said second layer to said support members along said remaining pair of opposite edges, wherein said first means is associated with both pairs of opposite edges of said second and third layers, wherein said first means for permitting and preventing comprises a plurality of peripherally spaced fasteners extending between said second, load-bearing layer and said third, load-bearing layer near the peripheries of said layers, whereby said evolved gases pass between said second and third layers to the exterior of said panel at locations between said fasteners, and wherein said second layer comprises a peripheral lip for engaging the periphery of said third layer, said plurality of fasteners extending through said lip into said third layer.

7. An improved fireproof building system, comprising:

a plurality of spaced, essentially parallel elongated support members;

a plurality of fireproof panels, each panel comprising
 a first, substantially quadrangular layer of cellular, thermal insulating material;
 a second, substantially quadrangular, load-bearing layer;
 a third, substantially quadrangular, load-bearing layer extending between said first and second layers and contacting at least said second layer, said third layer being made of a material having sufficient mechanical strength to maintain the load-bearing capacity of said panel for an extended period of time when heat applied externally to said second layer causes the load-bearing characteristics of said second layer to degrade, said material also having sufficient thermal insulation properties to prevent damage to said first layer during said extended period of time;

first means operatively associated with at least one pair of opposite edges of second and third layers for permitting gases evolved from said third layer during application of said heat to escape from between said second and third layers and for preventing air external to said panel from entering the space created between said second and third layers by the pressure of said evolved gases; and means for mounting said plurality of fireproof panels to said plurality of support members with said at least one pair of opposite edges of each panel extending transversely between said support members and with the remaining pair of opposite edges of each panel extending axially along said support members and for clamping said second layer to said support members along said remaining pair of opposite edges, and wherein said panels comprise a groove extending along each of said at least one pair of opposite edges, further comprising a plurality of fillet strips extending between said grooves on adjacent panels, said fillet strips being made of a material similar to that of said third layer.

8. An improved fireproof building system according to claim 7 wherein said means for mounting and clamping comprises at least one mounting bracket affixed to each of said panels above said groove at least at one of said at least one pair of opposite edges and a fastener extending through said bracket and said fillet strip into one of said support members.

9. An improved fireproof building system according to claim 7 wherein said means for mounting and clamping comprises a clamping strip extending along the joint between said remaining pairs at opposite edges on adjacent panels and a fastener extending through said clamping strip, between said adjacent panels and into engagement with one of said support members.

* * * * *